(12) United States Patent
Kolcz

(10) Patent No.: US 8,024,413 B1
(45) Date of Patent: *Sep. 20, 2011

(54) RELIABILITY MEASURE FOR A CLASSIFIER

(75) Inventor: Aleksander Kolcz, Fairfax, VA (US)

(73) Assignee: AOL Inc., Dulles, VA (US)

(*) Notice: Subject to any disclaimer, the term of this patent is extended or adjusted under 35 U.S.C. 154(b) by 64 days.

This patent is subject to a terminal disclaimer.

(21) Appl. No.: 12/502,688

(22) Filed: Jul. 14, 2009

Related U.S. Application Data (63) Continuation of application No. 11/356,322, filed on Feb. 17, 2006, now Pat. No. 7,577,709.

(60) Provisional application No. 60/653,963, filed on Feb. 17, 2005, provisional application No. 60/656,542, filed on Feb. 28, 2005, provisional application No. 60/680,520, filed on May 13, 2005.

(51) Int. Cl.
*G06F 15/16* (2006.01)
*G06F 15/18* (2006.01)

(52) U.S. Cl. .................. 709/206; 706/20; 706/25

(58) Field of Classification Search .......... 709/206, 709/224; 706/14, 20, 25
See application file for complete search history.

(56) References Cited

U.S. PATENT DOCUMENTS

| | | | |
|---|---|---|---|
| 5,493,221 A | 2/1996 | Wertz | |
| 5,671,333 A | 9/1997 | Catlett et al. | |
| 5,796,863 A | 8/1998 | Lyon | |
| 5,805,730 A | 9/1998 | Yaeger et al. | |
| 5,805,731 A | 9/1998 | Yaeger et al. | |
| 6,161,130 A | 12/2000 | Horvitz et al. | |
| 6,199,103 B1 | 3/2001 | Sakaguchi | |
| 6,330,590 B1 | 12/2001 | Cotten | |
| 6,421,709 B1 | 7/2002 | McCormick | |
| 6,507,866 B1 | 1/2003 | Barchi | |
| 6,732,149 B1 | 5/2004 | Kephart | |
| 6,823,323 B2 * | 11/2004 | Forman et al. | 706/20 |
| 6,829,635 B1 | 12/2004 | Townshend | |
| 6,976,207 B1 | 12/2005 | Ruján et al. | |
| 2002/0116463 A1 | 8/2002 | Hart | |
| 2002/0116641 A1 | 8/2002 | Mastrianni | |
| 2002/0147754 A1 | 10/2002 | Dempsey et al. | |
| 2002/0181703 A1 | 12/2002 | Logan et al. | |
| 2002/0199095 A1 | 12/2002 | Bandini et al. | |
| 2004/0083270 A1 * | 4/2004 | Heckerman et al. | 709/207 |
| 2004/0120488 A1 * | 6/2004 | Dempsey et al. | 379/114.14 |
| 2005/0021290 A1 | 1/2005 | Velipasaoglu et al. | |

(Continued)

OTHER PUBLICATIONS

Apte et al., Automated Learning of Decision Rules for Text Categorization, ACM Transactions on Information Systems, vol. 12, No. 3, Jul. 1994, pp. 233-251.

(Continued)

*Primary Examiner* — Brian J Gillis
(74) *Attorney, Agent, or Firm* — Finnegan, Henderson, Farabow, Garrett & Dunner, LLP (57) ABSTRACT

In one aspect, a data item is input into a scoring classifier such that the scoring classifier indicates that the data item belongs to a first class. A determination is made as to the amount of retraining of the scoring classifier, based on the data item, that is required to cause the scoring classifier to indicate that the data item belongs to a second class. A reliability measure is determined based on the required amount of retraining and a class of the data item is determined based, at least in part, on the reliability measure.

21 Claims, 8 Drawing Sheets

U.S. PATENT DOCUMENTS

2006/0112038 A1* 5/2006 Luo .................................. 706/20

OTHER PUBLICATIONS

Beitzel et al., Evaluation of Filtering Current News Search Results, ACM SIGIR conference on Research and development in information retrieval, 2004, pp. 1-2.

Bennett et al., Probabilistic Combination of Text Classifiers Using Reliability Indicators: Models and Results, Proceedings of $25^{th}$ Annual International ACM SIGIR Conference on Research and Development in Information Retrieval, 2002, pp. 207-214.

Bennett, Using Asymmetric Distributions to Improve Text Classifier Probability Estimates, Proceedings of the $26^{th}$ annual international ACM SIGIR Conference on Research and Development in Information Retrieval, 2003, pp. 111-118.

Bradley, The Use of the Area Under the ROC Curve in the Evaluation of Machine Learning Algorithms, Pattern Recognition, vol. 30, No. 7, 1997, pp. 1145-1159.

Chowdhury et al., Collection Statistics for Fast Duplicate Document Detection, ACM Transactions on Information Systems, vol. 20, No. 2, 2002, pp. 171-191.

Cleverdon, The Significance of the Cranfield Tests on Indexing Language, Proceedings of the $14^{th}$ International Conference on Research and Development in Information Retrieval, 1991, pp. 3-12.

Cohen et al., Context-Sensitive Learning Methods for Text Categorization, Proceedings of SIGIR-96, $19^{th}$ ACM International Conference on Research and Development in Information Retrieval, 1996, pp. 307-315.

Cover et al., Elements of Information Theory, John Wiley & Sons, Inc., 1991, pp. 1-8.

Cronen-Townsend et al., Predicting Query Performance, Proceedings of SIGR, 2002, pp. 299-306.

Domingos et al., On the Optimality of the Simple Bayesian Classifier Under Zero-One Loss, Machine Learning, vol. 29, 1997, pp. 103-130.

Domingos, Context-Sensitive Feature Selection for Lazy Learners, Artificial Intelligence Review, vol, 11, 1997, pp. 1-24.

Elkan, The Foundations of Cost-Sensitive Learning, Proceedings of the Seventeenth International Joint Conference on Artificial Intelligence, 2001, pp. 973-978.

Fleuret, Fast Binary Feature Selection With Conditional Mutual Information, Journal of Machine Learning Research 5, 2004, pp. 1531-1555.

Forman, An Extensive Empirical Study of Feature Selection Metrics for Text Classification, Journal of Machine Learning Research 3, 2003, pp. 1290-1305.

Friedman et al., Bayesian Network Classifiers, Machine Learning, vol. 29, 1997, pp. 131-163.

Graham, A Plan for Spam, http://www.paulgraham.com/spam.html, 2002, pp. 1-15.

Han et al., Centroid-Based Document Classification: Analysis and Experimental Results, Principles of Data Mining and Knowledge Discovery, 2000, pp. 424-431.

Harmon, Overview of the First Text Retrival Conference (TREC-1), Computer Systems and Technology, National Institute of Technology and Standards, 1992, pp. 1-20.

Khoavi et al., Wrappers for Feature Subset Selection, Artificial Intelligence, 1997, pp. 1-43.

Kolcz, Improved Naïve Bayes for Extreme Misclassification Costs, High Precision/Recall, abstract submitted Feb. 18, 2005.

Kolcz et al., Improved Naïve Bayes for Extreme Misclassification Costs, High Precision/Recall, abstract submitted May 2005.

Kolcz, Local Scarcity Control for Naïve Bayes With Extreme Misclassification Costs, submitted Feb. 28, 2005.

Koller et al., Toward Optional Feature Selection, International Conference on Machine Learning, 1996, pp. 284-292.

Kukar, Transductive Reliability Estimation for Medical Diagnosis, Artificial Intelligence in Medicine, vol. 29; 2003, pp. 81-106.

Lewis et al., A New Benchmark Collection for Text Categorization Research, Journal of Machine Learning Research, vol. 5, 2004, pp. 361-397.

Lewis et al., Training Algorithms for Linear Text Classifiers, Proceedings of SIGIR-96, $19^{th}$ ACM International Conference on Research and Development in Information Retrieval, 1996, pp. 298-306.

Lewis, Naïve (Bayes) At Forty: The Independence Assumption in Information Retrieval, $10^{th}$ European Conference on Machine Learning, 1998, pp. 4-15.

Manmatha et al., A Critical Examination of TDT's Cost Function, Proceedings of the $25^{th}$ Annual International ACM SIGIR Conference on Research and Development in Information Retrieval, 2002, pp. 403-404.

Manning et al., Foundations of Statistical Natural Language Processing, MIT Press, 1999, pp. 1-23.

McCallum et al., A Comparison of Event Models for Naïve Bayes Text Classification, Proceedings of the AAAI-98 Workshop on Learning for Text Categorization, 1998, pp. 1-8.

Mladenic et al,, Feature Selection for Unbalanced Class Distribution and Naive Bayes, Proceedings for the $16^{th}$ International Conference on Machine Learning, 1999, pp. 258-267.

Mladenic et al., Feature Selection Using Linear Classifier Weights: Interaction With Classification Models, Proceedings of SIGIR-04, 2004, pp. 234-241.

Moschitti, A Study on Optimal Parameter Tuning for Rocchio Text Classifier, Proceedings of ECIR-03, $25^{th}$ European Conference on Information Retrieval, 2003, pp. 420-435.

P.N. Bennett, Assessing the Calibration of Naïve Bayes Posterior Estimates, School of Computer Science, Carnegie Mellon University, Sep. 12, 2000., pp. 1-10.

Pavlov et al., Document Preprocessing for Naïve Bayes Classification and Clustering With Mixture of Multinomials, Proceedings of the ACM SIGKDD International Conference on Knowledge Discovery and Data Mining, 2004, pp. 1-6.

Platt, Probabilistic Outputs for Support Vector Machines and Comparisons to Regularized Likelihood Methods, Advances in Large Margin Classifiers, MIT Press, 1999, pp. 61-74.

Provost et al., Robust Classification for Imprecise Environments, Machine Learning, vol. 42, 2001, pp. 203-231.

Provost, Learning With Imbalanced Data Sets 101, Proceedings of the AAAI'2000 Workshop on Imbalanced Data Sets, 2000, pp. 1-5.

Rennie et al., Tackling the Poor Assumptions of Naïve Bayes Text Classifiers, Twentieth International Conference on Machine Learning, 2003, pp. 1-8.

Saerens et al., Adjusting the Outputs of a Classifier to New a Priori Probabilities: A Simple Procedure, Neural Computation, vol. 14, 2002, pp. 21-41.

Schohn et al., Less is More: Active Learning With Support Vector Machines, Proceeding of the $17^{th}$ International Conference on Machine Learning, 2000, pp. 839-846.

Voorhees, The Philosophy of Information Retrieval Evaluation, Proceedings of the $2^{nd}$ Workshop of the Cross-Language Evaluation Forum, 2001, pp. 355-370.

Webb et al., Adjusted Probability Naive Bayesian Induction, $11^{th}$ Australian Joint Conference on Artificial Intelligence, 1998, pp. 1-11.

Wu et al., A Refinement Aproach to Handling Model Misfit in Text Categorization, ACM SIKGDD International Conference on Knowledge Discovery and Data Mining, 2002, pp. 1-10.

Wu et al., The Anatomy of a Multimodal Information Filter, Ninth ACM SIKGDD International Conference on Knowledge Discovery and Data Mining, 2003, pp. 462-471.

Zadrozny et al., Obtaining Calibrated Probability Estimates From Decision Trees and Naive Bayesian Classifiers, Eighteenth International Conference on Machine Learning, 2001, pp, 1-8.

Zadrozny, et al., Transforming Classifier Scores in to Accurate Multiclass Probability Estimates, Eighth International Conference on Knowledge Discovery and Data Mining, 2002, pp. 1-6.

Zhang et al., Probabilistic Score Estimation With Piecewise Logistic Regression, Proceedings of the International Conference on Machine Learning, 2004, pp. 1-8.

* cited by examiner

RELIABILITY MEASURE FOR A CLASSIFIER

CLAIM OF PRIORITY

This application claims priority under 35 USC §119(e) to U.S. Provisional Application Ser. No. 60/653,963, filed on Feb. 17, 2005, entitled: "Naive Bayes for Extreme Misclassification Costs," U.S. Provisional Application Ser. No. 60/656,542, filed on Feb. 28, 2005, entitled: "Local Sparsity Control for Naive Bayes with Extreme Misclassification Costs," U.S. Provisional Application Ser. No. 60/680,520, filed May 13, 2005, entitled: "Naïve Bayes for Extreme Misclassification Costs," and U.S. patent application Ser. No. 11/356,322, filed Feb. 17, 2006, entitled: "Reliability Measure for a Classifier." These applications are hereby incorporated by reference.

TECHNICAL FIELD

This description relates to classifiers.

BACKGROUND

Classifiers based on machine learning techniques may be used to classify data items of unknown classification. One area in which such classifiers may be used is in filtering mass, unsolicited, commercial e-mailings (colloquially known as e-mail spam or spam e-mail). Spam e-mail is akin to junk mail sent through the postal service. However, because spam e-mail requires neither paper nor postage, the costs incurred by the sender of spam e-mail are quite low when compared to the costs incurred by conventional junk mail senders. Consequently, e-mail users now receive a significant amount of spam e-mail on a daily basis.

Spam e-mail impacts both e-mail users and e-mail providers. For e-mail users, spam e-mail can be disruptive, annoying, and time consuming. For e-mail and network service providers, spam e-mail represents tangible costs in terms of storage and bandwidth usage, which costs are not negligible due to the large number of spam e-mails being sent.

SUMMARY

In one aspect, a data item is input into a scoring classifier such that the scoring classifier indicates that the data item belongs to a first class. A determination is made as to the amount of retraining of the scoring classifier, based on the data item, that is required to cause the scoring classifier to indicate that the data item belongs to a second class. A reliability measure is determined based on the required amount of retraining and a class of the data item is determined based, at least in part, on the reliability measure.

Implementations may include one or more of the following features. For example, the scoring classifier may include a Naïve Bayes based classifier. The amount of retraining may be determined by determining the a number of times that the data item needs to be added to training data items having the second class to result in the scoring classifier indicating that the data item belongs to the second class.

The scoring classifier may indicate that the data item belongs to the first class by producing a classification score that indicates that the data item belongs to the first class. The classification score may be modified based on the reliability measure to produce a classification output. The classification output may be compared to a classification threshold to determine the class of the data item based on the reliability measure A new probability distribution of features for the second class based on the required amount of retraining may be determined and a difference between an original probability distribution of features for the second class and the new probability distribution of features for the second class may be measured to determine the reliability measure based on the required amount of retraining. The classification output may be obtained by modifying the classification score based on the measured difference between the original probability distribution of features for the second class and the new probability distribution of features for the second class. Measuring the difference between the original probability distribution of features for the second class and the new probability distribution of features for the second class may include determining the KL divergence between the original probability distribution of features for the second class and the new probability distribution of features for the second class. Modifying the classification score based on the measured difference between the original probability distribution of features for the second class and the new probability distribution of features for the second class may include modifying the first classification score based on the determined KL divergence.

In another aspect, a classification model is developed based on a set of training data items. The set of training data items including a first group of training data items having a first class and a second group of training data items having a second class. The classification model is applied to a data item to produce a first classification score for the data item, the classification score indicating that the data item belongs to the first class. A determination is made as to the number of times the data item would need to be added to the second group of training data items to create a modified training set of data items such that, if the classification model was developed with the modified set of training data items, applying the classification model to the data item would produce a second classification score that indicates the data item belongs to the second class. A reliability measure is determined based on the number of times the data item would need to be added to the second group of data items to create the modified training set of data items. The first classification score is modified based on the reliability measure to produce a classification output. The classification output is compared to a classification threshold to determine whether the data item belongs to the first class or the second class.

Implementations may include one or more of the following features. For example, the classification model may be a Naïve Bayes based classification model. The data item may include an e-mail.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

In general, a classifier is used to classify data items of unknown classification. Before classifying a data item of unknown classification, the classifier is trained using a set of data items of known classifications so that the classifier can then generate a classification output for unknown data items. The classification output is indicative of a degree of correlation between the data item and a particular class.

To classify a particular unknown data item, the classifier determines a classification output indicative of a degree of correlation between the data item and a particular class and compares the classification output to a classification threshold.

In one implementation, to determine the classification output, the classifier first determines a classification score also indicative of a degree of correlation between the data item and a particular class. The classifier then determines an initial classification for the data item based on the classification score. The classifier also determines an amount of retraining that would be needed to change the classification of the data item. The amount of retraining needed is then used to determine a reliability measure, which is used to modify the classification score to obtain the classification output. Doing so may compensate for overconfidence errors that can reduce the utility of a classifier.

The description that follows primarily describes an application of these techniques to e-mail spam filtering using a Naïve Bayes based classifier. However, the techniques may be used for spam filtering in other messaging mediums, including both text and non-text (e.g., images). For example, these techniques may be used for filtering spam sent using instant messaging, short messaging services (SMS), or Usenet group messaging.

In addition, these techniques may be applied to other classification problems such as fraud detection, medical diagnosis, and detection of documents related to a particular topic/theme (e.g., terrorist threats). Moreover, these techniques may be applied to classifiers that employ scoring classifiers other than Naïve Bayes classifiers. For example, these techniques may be applied to Rocchio based classifiers, centroid based classifiers, decision trees based classifiers, or support vector machines (SVMs) based classifiers.

Figure 1:
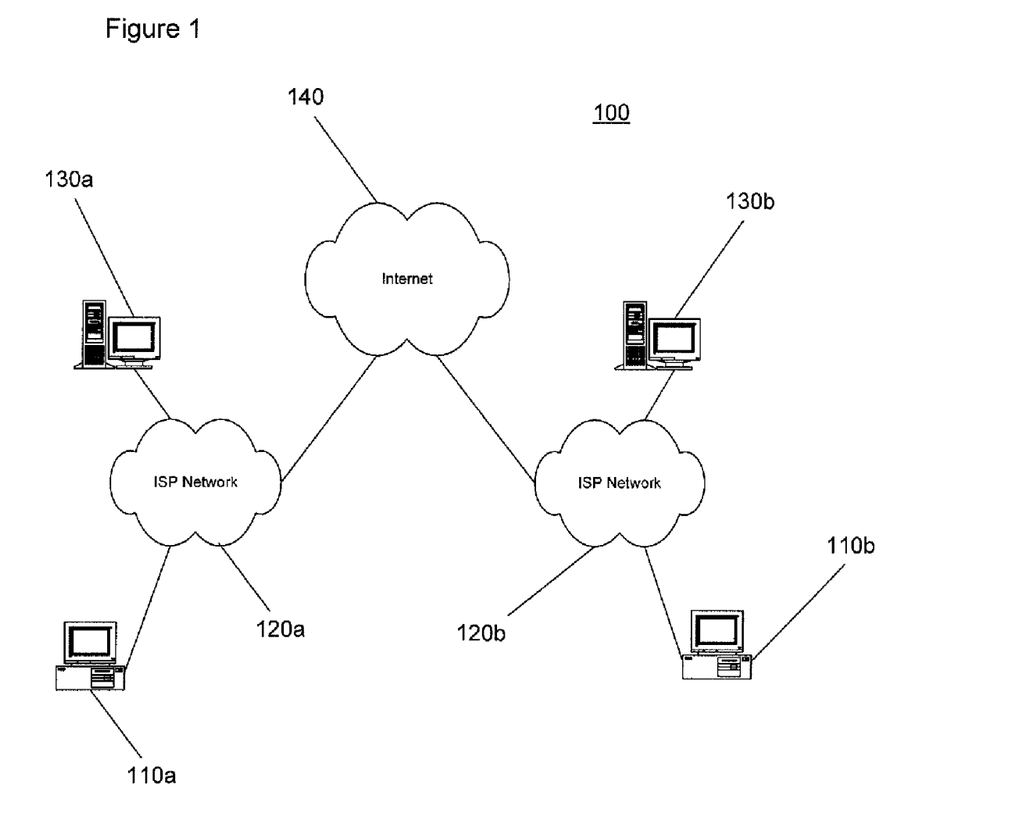
FIG. 1 illustrates an example of a networked computing environment that supports e-mail communications and in which spam filtering may be performed.

FIG. 1 illustrates an example of a networked computing environment 100 that supports e-mail communications and in which spam filtering may be performed. Computer users are distributed geographically and communicate using client systems 110a and 110b. Client systems 110a and 110b are connected to ISP networks 120a and 120b, respectively. While illustrated as ISP networks, each of networks 120a or 120b may be any type of network, such as, for example, a corporate network. Clients 110a and 110b may be connected to the respective ISP networks 120a and 120b through various communication mediums, such as a modem connected to a telephone line (using, for example, serial line internet protocol (SLIP) or point-to-point protocol (PPP)) or a direct network connection (using, for example, transmission control protocol/internet protocol (TCP/IP)), a wireless metropolitan network, or a corporate local area network (LAN). E-mail servers 130a and 130b also are connected to ISP networks 120a and 120b, respectively. ISP networks 120a and 120b are connected to a global network 140 (e.g. the Internet) so that a device on one ISP network can communicate with a device on the other ISP network. For simplicity, only ISP network 120a and 120b have been illustrated as being connected to Internet 140. However, there may be a great number of such ISP networks connected to Internet 140. Likewise, each ISP network may be connected to many e-mail servers and many client systems.

Each of the client systems 110a and 110b and e-mail servers 130a and 130b may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 110a and 110b and e-mail servers 130a and 130b may receive instructions from, for example, a software application, a program, a piece of code, a device, a computer, a computer system, or a combination thereof, which independently or collectively direct operations. These instructions may take the form of one or more communications programs that facilitate communications between the users of client systems 110a and 110b. Such communications programs may include, for example, e-mail programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 110a and 110b or the e-mail servers 130a and 130b.

Each client system 110a or 110b and e-mail server 130a or 130b includes a communications interface (not shown) used by the communications programs to send communications. The communications may include audio data, video data, general binary data, or text data (e.g., data encoded in American Standard Code for Information Interchange (ASCII) format or Unicode).

Examples of ISP networks 120a and 120b include Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network. Networks 120a and 120b may include multiple networks or subnetworks, each of which may include, for example, a wired or wireless data pathway.

An e-mail server 130a or 130b may handle e-mail for many thousands of e-mail users connected to ISP network 120a or 120b, although other e-mail servers may handle more or fewer users. An e-mail server 130a or 130b may handle e-mail for a single e-mail domain (e.g., aol.com) or for multiple e-mail domains. E-mail server 130a or 130b may be composed of multiple, interconnected computers working together to provide e-mail service for e-mail users of ISP network 120a or 120b.

An e-mail user, such as a user of client system 110a or 110b, may have one or more e-mail accounts on e-mail server 130a or 130b. Each account corresponds to an e-mail address. Each account may have one or more folders in which e-mail is stored. E-mail sent to one of the e-mail user's e-mail addresses is routed to e-mail server 130a or 130b and placed in the account that corresponds to the e-mail address to which the e-mail was sent. The e-mail user then uses, for example, an e-mail client program executing on client system 110a or 110b to retrieve the e-mail from e-mail server 130a or 130b and view the e-mail.

The e-mail client program may be, for example, a stand-alone e-mail application such as Microsoft Outlook or an e-mail client application that is integrated with an ISP's client for accessing the ISP's network, such as America Online (AOL) Mail, which is part of the AOL client. The e-mail client program also may be, for example, a web browser that accesses web-based e-mail services.

The e-mail client programs executing on client systems 110a and 110b also may allow one of the users to send e-mail to an e-mail address. For example, the e-mail client program executing on client system 110a allows the e-mail user of client system 110a (the sending user) to compose an e-mail message and address it to a recipient address, such as an e-mail address of the user of client system 110b. When the sending user indicates that an e-mail is to be sent to the recipient address, the e-mail client program executing on client system 110a communicates with e-mail server 130a to handle the transmission of the e-mail to the recipient address. For an e-mail addressed to an e-mail user of client system 110b, for example, e-mail server 130a sends the e-mail to e-mail server 130b. E-mail server 130b receives the e-mail and places it in the account that corresponds to the recipient address. The user of client system 110b then may retrieve the e-mail from e-mail server 130b, as described above.

In an e-mail environment such as that shown, a spammer typically uses an e-mail client or server program to send similar spam e-mails to hundreds, if not thousands or millions, of e-mail recipients. For example, a spammer may target hundreds of recipient e-mail addresses serviced by e-mail server 130b on ISP network 120b. The spammer may maintain the list of targeted recipient addresses as a distribution list. The spammer may use the e-mail program to compose a spam e-mail and instruct the e-mail client program to use the distribution list to send the spam e-mail to the recipient addresses. The e-mail then is sent to e-mail server 130b for delivery to the recipient addresses. Thus, in addition to receiving legitimate e-mails (i.e., non-spam e-mails), e-mail server 130b also may receive large quantities of spam e-mail, particularly when many spammers target e-mail addresses serviced by e-mail server 130b.

Figure 2:
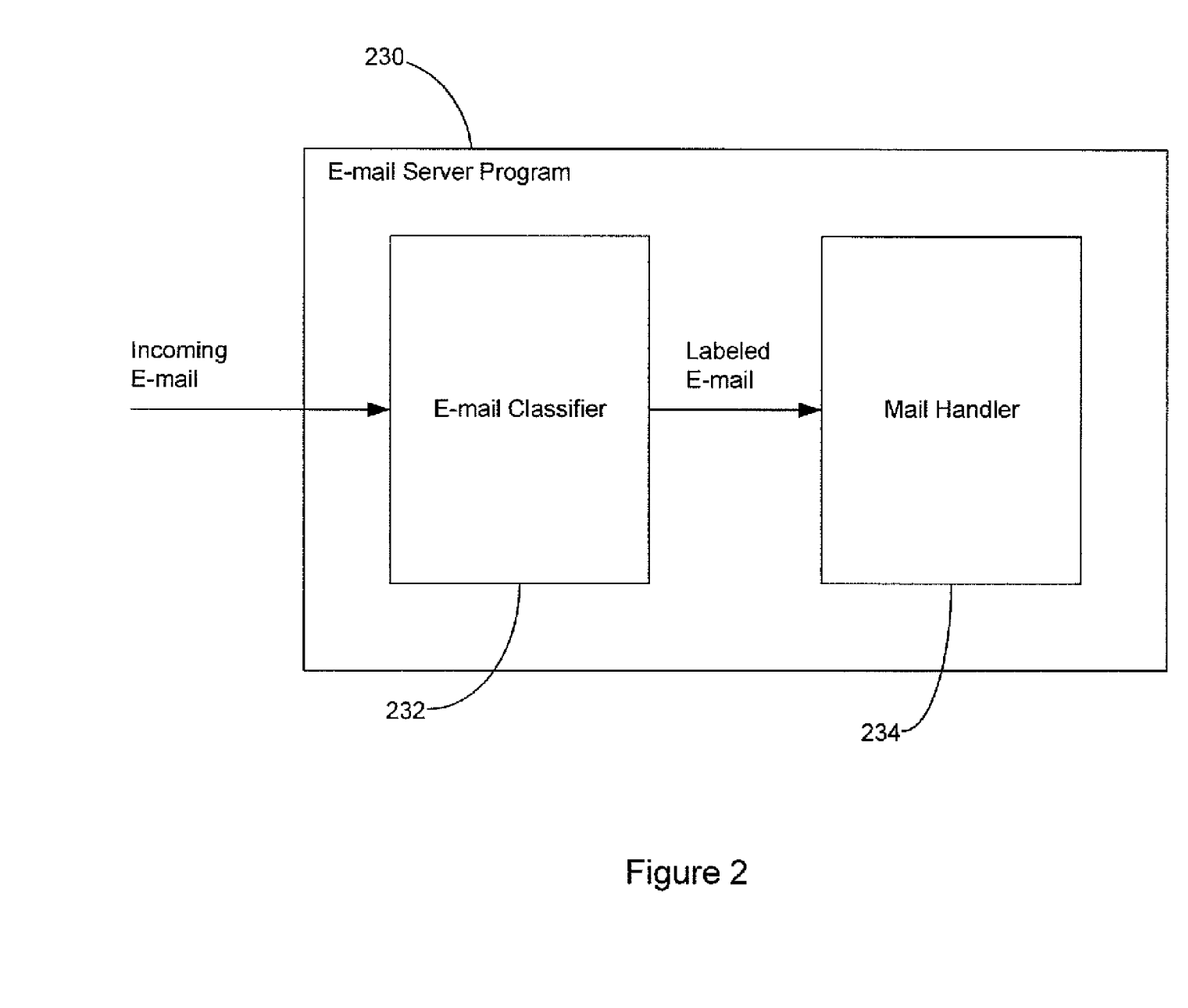
FIG. 2 is a high-level functional block diagram of an e-mail server program that may execute on an e-mail server to provide spam filtering.

FIG. 2 is a high-level functional block diagram of an e-mail server program 230 that may execute on an e-mail server, such as e-mail server 130a or 130b, to provide spam filtering. E-mail server program 230 includes a Naïve Bayes based e-mail classifier 232 and a mail handler 234. During operation, the incoming e-mail arriving at e-mail server program 230 passes through e-mail classifier 232. E-mail classifier 232 classifies incoming e-mail by making a determination of whether a particular e-mail passing through classifier 232 is spam or legitimate e-mail (i.e., non-spam e-mail) and labeling the e-mail accordingly (i.e., as spam or legitimate). E-mail classifier 232 forwards the e-mail to mail handler 234, and mail handler 234 handles the e-mail in a manner that depends on the policies set by the e-mail service provider. For example, mail handler 234 may delete e-mails marked as spam, while delivering e-mails marked as legitimate to an "inbox" folder of the corresponding e-mail account. Alternatively, e-mail labeled as spam may be delivered, to a "spam" folder or otherwise, instead of being deleted. The labeled mail may be handled in other ways depending on the policies set by the e-mail service provider.

While the e-mail classifier 232 and the mail handler 234 have been illustrated as part of an e-mail server program 230, these components may instead be implemented in an e-mail client program.

Before classifier 232 is used to classify incoming e-mail, classifier 232 is trained. Classifier 232 is trained using a training set of e-mail to develop an internal model that allows classifier 232 to determine a classification output for unknown e-mail.

During classification, e-mail classifier 232 makes the determination of whether a given e-mail is spam by analyzing the e-mail to determine a classification output for the e-mail. The classification output is based on the probability estimate that the e-mail is spam and, therefore, indicates a confidence level that the e-mail is spam. The e-mail classifier 232 then compares the classification output to a threshold and, if the classification output is above a certain threshold, the e-mail is labeled as spam.

Because classifier 232 classifies e-mail based on a score that indicates a confidence level of whether the e-mail is spam, there is the chance that a spam e-mail will be misclassified as legitimate and that legitimate e-mail will be classified as spam. There are generally costs associated with such misclassifications. For the e-mail service provider, misclassifying spam e-mail as legitimate results in additional storage costs, which might become fairly substantial. In addition, failure to adequately block spam may result in dissatisfied customers, which may result in the customers abandoning the service. The cost of misclassifying spam as legitimate, however, may generally be considered nominal when compared to the cost of misclassifying legitimate e-mail as spam, particularly when the policy is to delete or otherwise block the delivery of spam e-mail to the e-mail user. Losing an important e-mail may mean more to a customer than mere annoyance. Cost, therefore, may take into account factors other than just monetary terms.

While generally accurate, a Naive Bayes based classifier, at times, may be very wrong, such that it erroneously indicates with a high confidence that the input belongs to the wrong class. In particular, the class-probability estimates of a Naïve Bayes based classifier may tend to be clustered near the extreme values of 0 and 1. Thus, when a Naïve Bayes based classifier assigns a classification score that indicates an input item belongs to the incorrect class, that classification score may indicate a very high confidence that the input item belongs to the incorrect class. For example, if a class-probability estimate of 1 corresponds to spam e-mail, while 0 corresponds to legitimate e-mail, then a Naïve Bayes based classifier may provide a probability estimate for a legitimate e-mail close to 1, which results in a classification score that incorrectly indicates, with a very high level of confidence, that the legitimate e-mail is spam.

The apparent high confidence with which certain errors are made may be particularly problematic when misclassification costs are highly skewed, such as, for example, when there is an order of magnitude or more between the misclassification costs. This is because, in part, applications that include highly asymmetric misclassification costs have a lower tolerance for either false positives or false negatives, or both. For example, in a system that has an objective of identifying spam, there may be a low tolerance for false positives because users may turn away from a spam filter the first time they have an e-mail deleted because it is mistakenly identified as spam. As another example, in a system that has an objective of identifying terrorist plots, there may be a low tolerance for false negatives because the potential loss of life may be too high if a plot is mistakenly discarded (i.e., identified as not being a plot). To counteract such low tolerances for false positives or false negatives, a conservative setting of the decision threshold may help guarantee that the more costly misclassifications are not made, even when the classification score indicates a high confidence that the item should be classified in the wrong class. This, however, can greatly decrease the utility of the classifier, because the less costly misclassifications are made more often.

Furthermore, this overconfidence may be particularly true in the text domain. When classifying documents with many features, their correlations may compound each other, thus leading to exponential growth in the odds. Thus, if a document consists of a large number of highly correlated features, for which the odds are only slightly in favor of a particular class, the compounding effect of the feature independence assumption can make the overall odds for the class quite high. The compounding effect can be even stronger in areas of the input space that were only sparsely represented by the training data. Longer documents may be more likely to be misclassified with a particularly high confidence.

To compensate for such overconfidence errors, a reliability measure is used to modify the classification score provided by the Naïve Bayes classifier used in e-mail classifier 232. For a given input item, the reliability measure is based on the amount of retraining that would be required to change the classification assigned to that input item. Generally, Naïve Bayes classifiers can be expected to be stable under small adjustments of the training data. Thus, in order for the classification of an input item to be changed, a more extensive change to the distribution of the training data may be needed. Accordingly, a measure of the reliability of the Naïve Bayes classification score can be obtained based on how much of a change to the training data is required to change the classification of an input item. A more reliable classification score will require a larger amount of change than a less reliable classification score.

To provide an illustrative example, a Naïve Bayes based classifier may classify an e-mail message as non-spam. That e-mail message may be added to the spam training data and the Naïve Bayes based classifier retrained. If that retraining does not cause the classifier to classify the same e-mail as spam, then the e-mail is added to the training data again, and the classifier is retrained. This continues until the classifier classifies the e-mail as spam. In this scenario, the reliability of the classifier's initial decision can be linked to the number of times the classifier is retrained based on the e-mail to change its outcome, which in turn translates to the amount of change to the training distribution needed for decision reversal. Decisions that are reliable will require more extensive adjustment of the distribution (and, hence, a greater number of times the classifier is retrained) than less reliable ones. More colloquially, the classification is less reliable if it takes only a few iterations of retraining to get the classifier to change its mind. The information regarding the amount of retraining is used to obtain a reliability measure that is used to modify the classifier's classification score. The modified classification score is then used to classify the e-mail.

Figure 3:
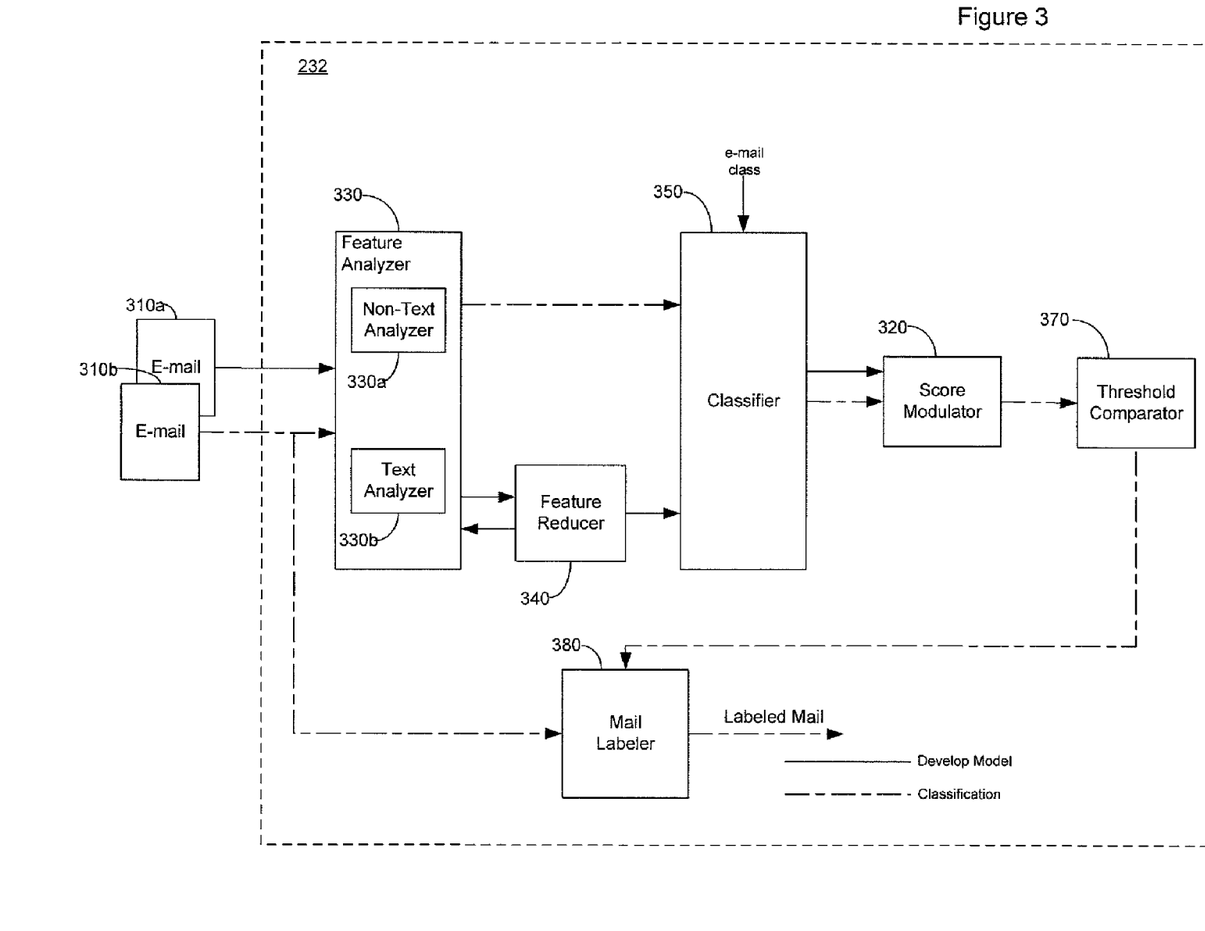
FIG. 3 is a functional block diagram of an e-mail classifier.

FIG. 3 is a functional block diagram of one implementation of the e-mail classifier 232. E-mail classifier 232 includes a feature analyzer 330, a feature reducer 340, a Naïve Bayes classifier 350, a score modulator 320, a threshold comparator 370, and a mail labeler 380. The various components of e-mail classifier 232 generally function and cooperate during two phases: training and classification. To simplify an understanding of the operation of e-mail classifier 232 during each phase, the data flow between the various e-mail classifier 232 components is shown separately for each phase. A non-broken line is shown for data flow during the training phase and a broken line with alternating long and short dashed lines indicates the data flow during classification.

Figure 4A:
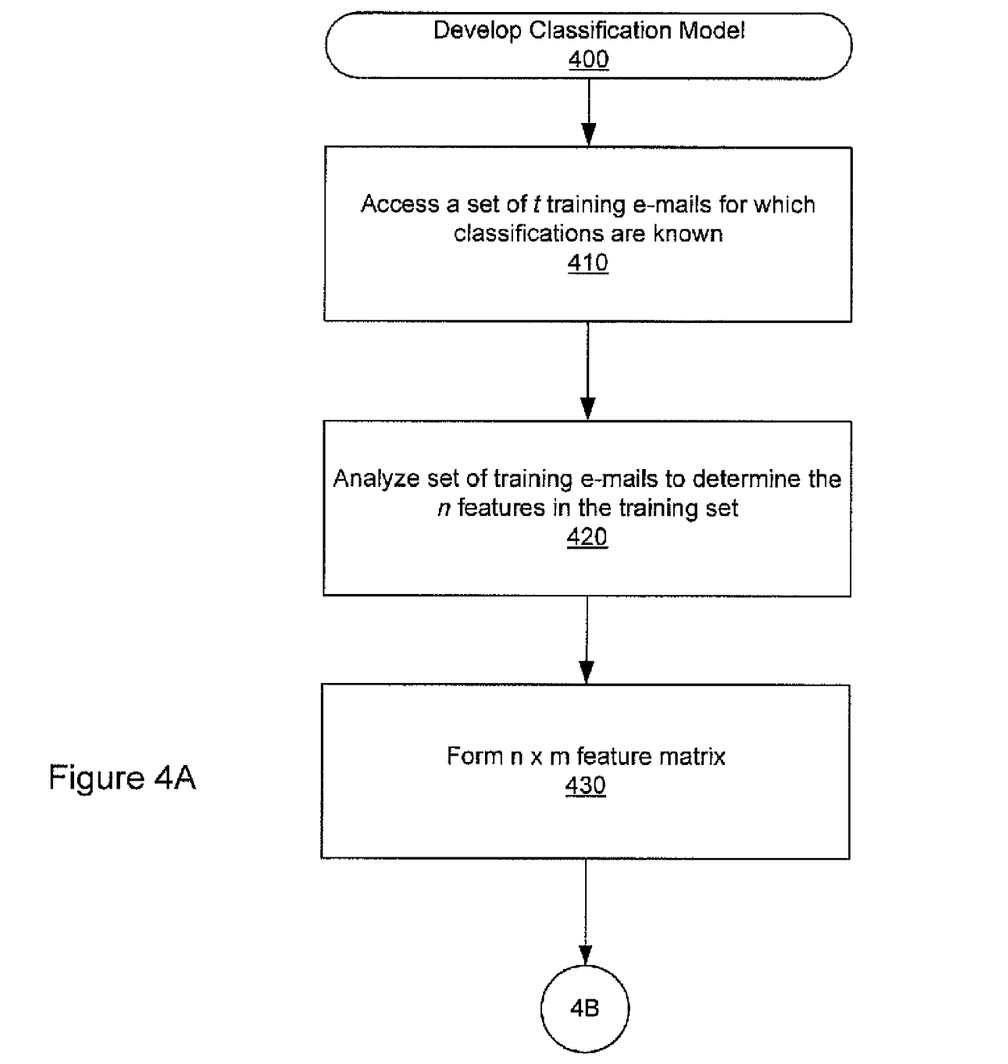
FIGS. 4A and 4B collectively provide a flow chart illustrating an example of a process by which the e-mail classifier of FIG. 3 may be trained.
Figure 4B:
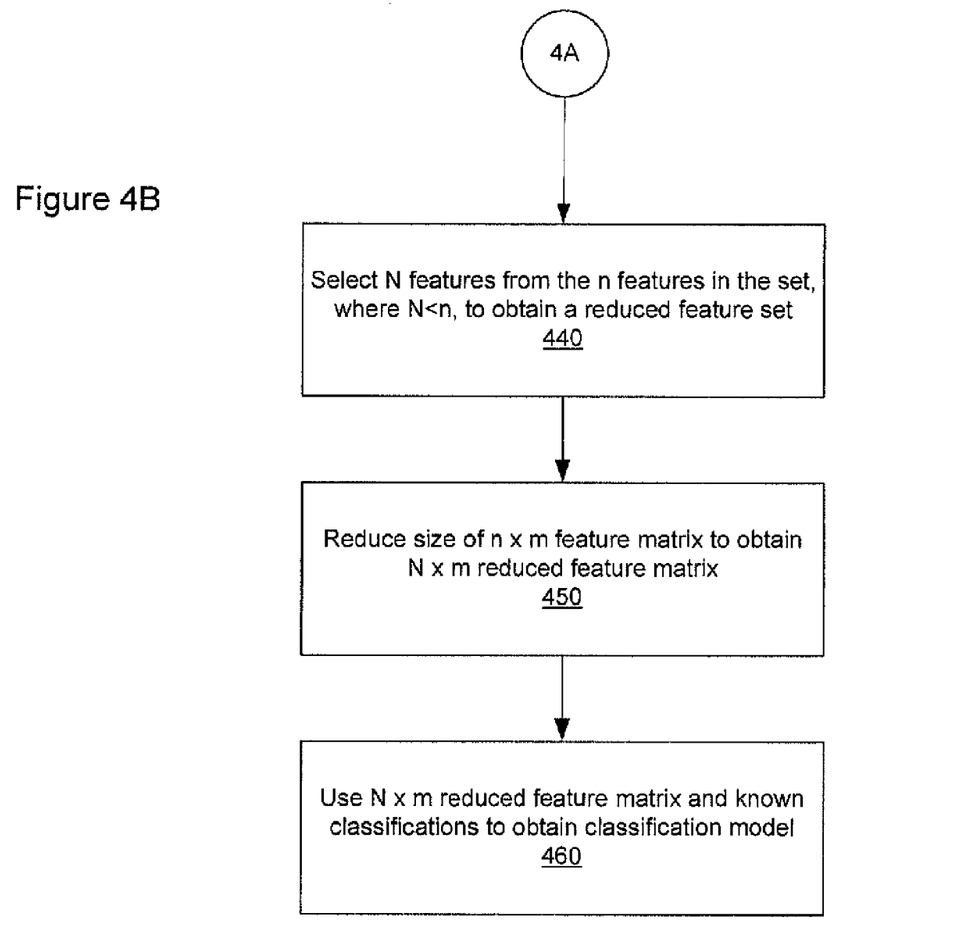

Referring to FIG. 4A, in general, during the training phase (i.e., when a classification model is developed) (400) a set of t e-mails (the "training e-mails") having a known classification (i.e. known as spam or legitimate) are accessed (410) and used to train classifier 232. Each e-mail in the unique set of t training e-mails is analyzed to obtain the n features (described further below) of the set of training e-mails (420) and to form an n-by-m feature matrix (430). Referring to FIG. 4B, feature selection is performed to select N features of the n feature set, where N<n (440), and the n-by-m feature matrix is reduced accordingly to an N-by-m reduced feature matrix (450). The N-by-m reduced feature matrix is used along with the known classification of the unique training e-mails to obtain an internal classification model (460).

More particularly, and with reference to the unbroken reference flowpath of FIG. 3, at set of training e-mails 310a is input into classifier 232 and applied to feature analyzer 330 (420). During training, feature analyzer 330 analyzes the t set of training e-mails to determine n features of the set of t training e-mails (the "feature set"). The feature set may be composed of text and non-text features. Text features generally include the text in the bodies and subject lines of the e-mails. Non-text features may include various other attributes of the e-mails, such as formatting attributes (e.g., all caps), address attributes (e.g., multiple addressees or from a specific e-mail address), or other features of an e-mail message, such as whether there is an attachment or image, audio or video features embedded in the e-mail.

Feature analyzer 330 includes a non-text analyzer 330a and a text analyzer 330b. During training, text analyzer 330b identifies text features of each e-mail message in the set of t training e-mails. Text analyzer 330b may tokenize each e-mail to determine the text features. A token is a textual component in the body or subject line and, for example, may be defined as letters separated from another set of letters by whitespace or punctuation. Text analyzer 330b keeps track of tokens and e-mails within which the tokens occur.

Non-text analyzer 330a determines whether each non-text feature is present in each e-mail. The exact non-text features for which each e-mail is analyzed typically are a matter of design and empirical judgment. For each non-text feature, a binary value is generated to indicate whether the feature is present.

Feature analyzer 330 creates a sparse n-by-m feature matrix (where n is the total number of text and non-text features) from the results of text analyzer 330b and non-text analyzer 330a (430). Each entry in the matrix is a binary value that indicates whether the $n^{th}$ feature is present in the $m^{th}$ e-mail.

The n-by-m feature matrix is provided to feature reducer 340, which reduces the n-by-m feature matrix to a sparse N-by-m reduced feature matrix (where N is less than n), using, for example, mutual information (440 and 450). In other words, feature reducer 340 selects a reduced set of the n features (the "reduced feature set") and reduces the size of the feature matrix accordingly. Techniques other than mutual information may be used, alternatively or additionally, to implement such feature selection. For example, document frequency thresholding, information gain, term strength, or $\chi^2$ may be used. In addition, some implementations may forego feature selection/reduction and use all of the n features from the set of t training e-mails.

The N selected features are communicated to feature analyzer 330, which analyzes the incoming e-mails during the classification phase for the N selected features instead of all of the n features in the incoming e-mails.

The N-by-m reduced feature matrix is input into classifier 350. Each row of the N-by-m reduced feature matrix corresponds to one of the training e-mails and contains data indicating which of the N selected features are present in the corresponding training e-mail. Each row of the reduced feature matrix is applied to classifier 350. As each row is applied to classifier 350, the known classification of the training e-mail to which the row corresponds also is input.

In response to the N-by-m reduced feature matrix and corresponding classifications, Naïve Bayes classifier 350 builds an internal classification model that is used to evaluate future e-mails with unknown classification (e.g., non-training e-mails) (460). The Naïve Bayes classifier 350 may be implemented, for example, using the multinomial model. In general, given an input e-mail x, a Naïve Bayes classifier bases its classification on the posterior probability of one or more classes. The posterior probability of a given class C can be represented using the Bayes formula $$P(C \mid x) = P(C) \frac{P(x \mid C)}{P(x)} \quad (1)$$

where, assuming feature independence, P(x|C) can be estimated as $$P(x \mid C) = \prod_{x_i \in x} P(x_i \mid C)^{f_i} \quad (2)$$

where $x_i$ is the i-th component of x and $f_i$ denotes the number of occurrences of $x_i$ in x. The multinomial model may be used to estimate $P(x_i|C)$ as $$P(x_i \mid C) = \frac{1 + N(x_i, C)}{V + \sum_j N(x_j, C)} \quad (3)$$

where $N(x_i,C)$ is the number of times $x_i$ appeared in training e-mails belonging to the class C, V represents the number of features in the reduced feature set, $\sum_j N(x_j,C)$ represents the sum of the occurrences in the training data of all features that have some presence in class C, and $$\sum_i^V P(x_i \mid C) = 1 \quad (4)$$

This assumes Laplace smoothing of the probability estimates, although alternative smoothing schemes are possible and lead to improved accuracy.

Thus, to develop the classification model, the Naïve Bayes classifier 350 uses the reduced feature matrix, the known classifications, and equation (3) to estimate the probability distributions for the features of the classes (spam and legitimate). That is, the classifier 350 determines the probability distributions by evaluating $P(x_i|C)$ for C equal to spam and for C equal to legitimate (denoted below as $P(x_i|S)$ and $P(x_i|L)$, respectively). Specifically, for each feature $x_i$ in the reduced feature set, $P(x_i|S)$ and $P(x_i|L)$ are determined. The probability distributions are then used by the classifier 350 during classification to develop a classification score for an input e-mail. In addition, the probability distributions are passed to the score modulator 320 for use during classification to determine a reliability measure, as described below.

Figure 5:
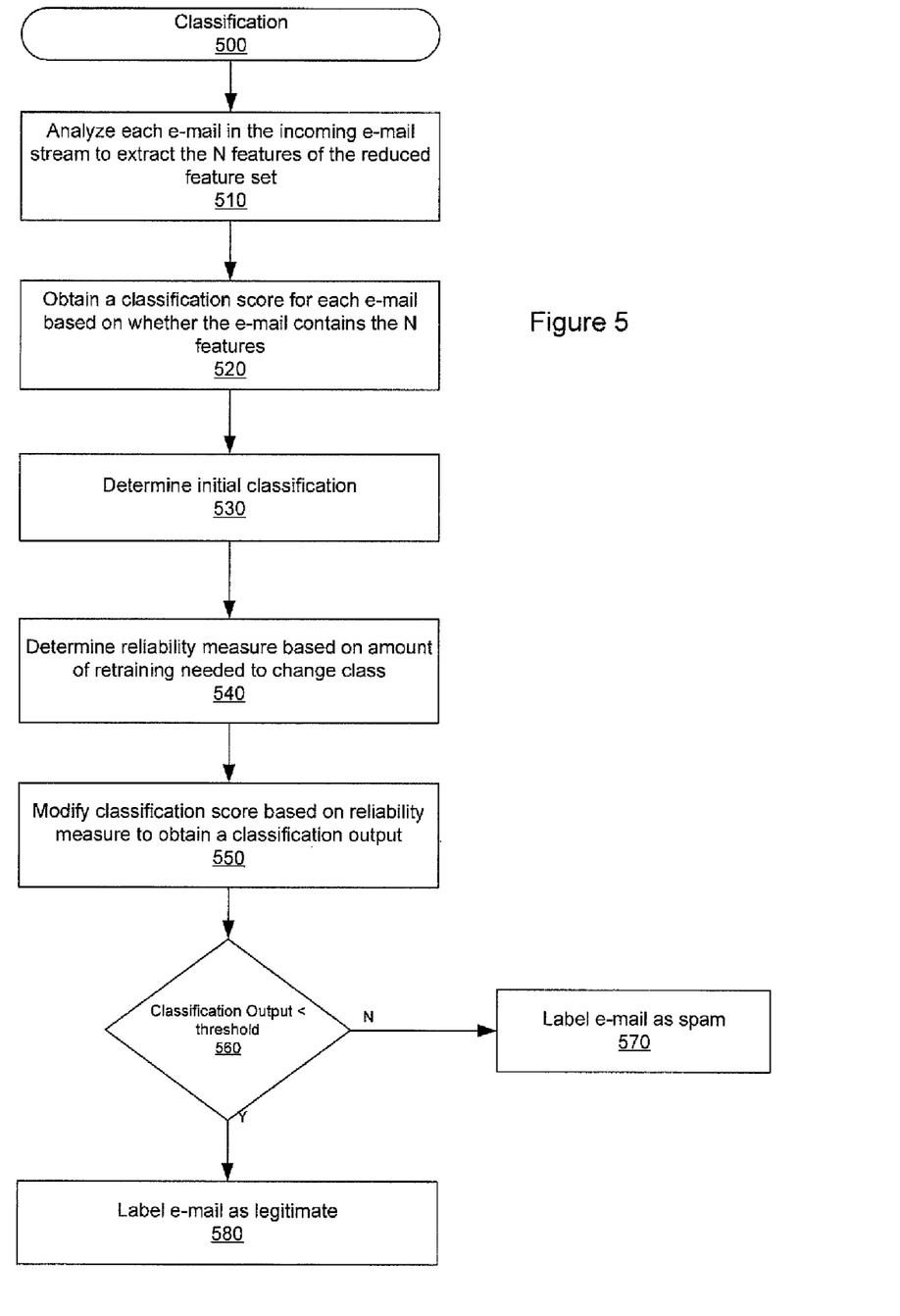
FIG. 5 is a flow chart illustrating an example of a process by which the e-mail classifier of FIG. 3 may classify incoming e-mail.

Referring to FIG. 5, in general, during classification (500) each e-mail in the incoming e-mail stream is analyzed to determine whether it contains the N features of the reduced feature set (510). This data is used to obtain a classification score for the e-mail (520) and an initial classification of the e-mail is determined based on the classification score (530). A reliability measure is then determined based on an amount of retraining needed to change the initial classification of the e-mail to the opposite class (540). The classification score is modified based on the reliability measure to obtain a classification output (550).

The e-mail is then classified by comparing the classification output to the classification threshold and labeling the e-mail accordingly. For example, if the classification output is equal to or above the classification threshold (560), the e-mail is labeled as spam (570). If the classification output is below the classification threshold, the e-mail is labeled as legitimate (580).

In particular, and with reference to the long-and-short dashed reference line of FIG. 3, during the classification phase, incoming e-mails of unknown class 310a are input into classifier 232 as they arrive at the e-mail server. As an incoming e-mail arrives, the e-mail is input to feature analyzer 330. Feature analyzer 330 determines whether the incoming e-mail has the N features of the reduced feature set and constructs an N element feature vector (510).

The N element feature vector is input into Naïve Bayes classifier 350, which applies the internal classification model to the feature vector to obtain a classification score that indicates a confidence level that the e-mail is spam (520). For example, when there are only two classes (spam and legitimate), the classification score may be formulated in terms of the log odds score (otherwise referred to as the log likelihood ratio) for the spam class S:

$$\text{score}(x) = \log\left(\frac{c_{01}}{c_{10}} \frac{P(S \mid x)}{P(L \mid x)}\right) = \log\frac{c_{01}}{c_{10}} + \log\frac{P(S)}{P(L)} + \sum_i \frac{P(x_i \mid S)}{P(x_i \mid L)} \quad (5)$$

where S is the class of spam and L is the class of legitimate, as indicated above, and $c_{01}$ and $c_{10}$ are the costs of misclassifying spam as legitimate and misclassifying legitimate as spam, respectively. While an implementation in which the calculation of the classification score includes misclassification costs, other implementations may exclude misclassification costs.

The classification score is passed to the score modulator 320 which makes an initial determination of the e-mail's class based on the classification score and a classification threshold θ (530). For example, when using the log odds score, the e-mail may be initially classified as spam when score(x) exceeds or equals the threshold θ:

$$\text{score}(x) \geq \theta \Rightarrow S$$

$$\text{score}(x) < \theta \Rightarrow L \quad (6)$$

and, in one implementation, the threshold θ is set to 0. However, from equation (5), it can be seen that the costs and class priors (($P(S)$ and $P(L)$)) are independent of the input x. Therefore, in some implementations, θ is adjusted to take these values into account. Additionally, or alternatively, the threshold θ may be adjusted to minimize or reduce misclassification costs using, for example, a Receiver Operating Characteristic (ROC) analysis, as described further below.

Once the initial classification is determined, the score modulator 320 determines a reliability measure based on the amount of retraining that is needed to change the initial classification of the e-mail (540). For example, if the initial classification of the e-mail is spam, then the score modulator 320 determines the amount of retraining based on the e-mail that is needed to classify the e-mail as non-spam, and determines the reliability measure based on the amount of retraining needed. In particular, if the classification scheme of equation (6) is used, then the score modulator 320 determines the reliability score based on how much retraining is needed to achieve a value of score(x) that crosses the threshold θ. An example of a process for determining the reliability measure and modifying the classification score based on the reliability measure is described below with respect to FIG. 6.

The score modulator 320 then generates a classification output by modifying the classification score based on the reliability measure (550) and passes the classification output to the threshold comparator 370. Threshold comparator 370 applies the comparison scheme (e.g., equation (6)) (560) and produces an output accordingly. The output of threshold comparator 370 is applied to mail labeler 380.

The incoming e-mail also is input to mail labeler 380. When the output of threshold comparator 370 indicates the classification output is equal to or greater than the classification threshold, mail labeler 380 labels the incoming e-mail as spam (570). When the output of threshold comparator 370 indicates the classification output is less than the classification threshold, mail labeler 380 labels the incoming e-mail as legitimate (580). The labeled e-mail then is output by mail labeler 380 and sent to mail handler 234.

Figure 6:
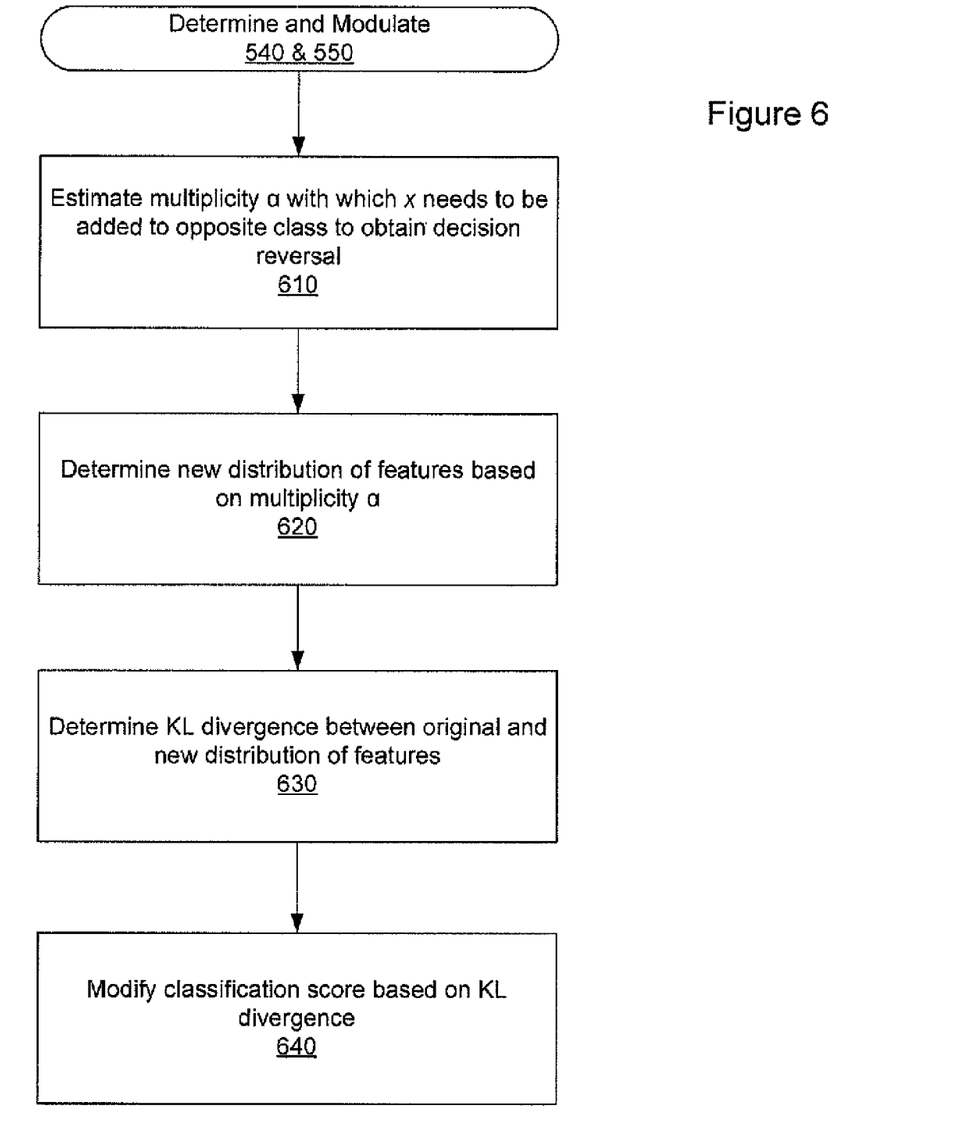
FIG. 6 is a flow chart illustrating an example of a process by which a reliability measure may be determined and used to modify a classification score of the classifier of FIG. 3.

FIG. 6 shows an example of a technique for determining the reliability measure (540) and modifying the classification score based on the reliability measure (550). In the following discussion, C represents the class to which the e-mail was originally assigned, and $\overline{C}$ represents the opposite class. When a classification scheme such as the one in equations (5) and (6) is used, then the following equation defines what is needed for decision reversal, assuming that the threshold θ is 0 and that the perturbation of the training data does not alter class priors:

$$\log\left(\frac{P(x \mid C)}{p(x \mid \overline{C})}\right) = \log\left(\frac{\tilde{P}(x \mid \overline{C})}{\tilde{P}(x \mid C)}\right) - \text{score}$$

where score is the original output score (equation (5)), while $\tilde{P}(x|C)$ and $\tilde{P}(x|\overline{C})$ denote estimates over the altered training data. Conceptually, the process of perturbing the training set aims to outweigh evidence for the originally predicted class with similar evidence for the opposite class and then to measure the amount of change between the two. According to equation (7), this can be achieved by altering $P(x|C)$ or $P(x|\overline{C})$, or both. In the technique shown in FIG. 6, $P(x|\overline{C})$ is modified by considering the input e-mail x as being repeatedly added to the training set for $\overline{C}$. Consequently, the effect of such retraining is that the cluster of content including the e-mail will span the two classes. However, alternatively, a technique can be used in which both $P(x|C)$ and $P(x\overline{C})$ are altered, with the effect of moving the cluster of content surrounding the e-mail from the predicted class to the opposite class. Additionally, techniques may be employed which alter $P(x|C)$.

As shown in FIG. 6, the score modulator 320 determines the multiplicity a with which the e-mail needs to be added to the training data of the opposite class to obtain a decision reversal (610). In one implementation, the e-mail is added to the training data for the opposite class, the probability distribution for the opposite class and classification score are recomputed, and the score is used to determine if an opposite class is achieved. This is performed repeatedly until a decision reversal is achieved, and the number of times the e-mail was added to the training data of the opposite class is recorded.

Such an implementation, however, may require that the e-mail be added to the opposite class and the score recomputed a hundred times or more, thereby adding significantly to the classification time. Accordingly, an alternative implementation treats the score as a function of the multiplicity α and identifies the zero-crossing of score(α) using root finding (e.g., using the Newton or the secant method) to determine the value for a that changes the decision. Using the Newton method, the derivative of the score(α) is used. In computing the derivative, it may be assumed that perturbing the training data does not affect the class priors. For example, if the perturbation is done by adding input e-mail x (containing A features from vocabulary V) to class C with some multiplicity α, the derivative of the score function with respect to α evaluates to $$\frac{\delta\text{score}(x)}{\delta\alpha} = \frac{\delta}{\delta\alpha}\left(const + \sum_{i \in A}\log(1 + (1+\alpha)n_i) - A \cdot \log\left(V + \sum_j n_j + \sum_{i \in A}\alpha n_i\right)\right)$$

$$= \frac{n_i}{1 + (1+\alpha)n_i} - \frac{A\sum_{i \in A} n_i}{V + \sum_j n_j + \sum_{i \in A}\alpha n_i}$$

where $n_i = N(x_i, C)$ is the count of feature xi in class C prior to perturbation and A is the set of features covered by x, and const is equal to log $$\frac{c_{01}}{c_{10}} + \log\frac{P(S)}{P(L)}.$$

Once the multiplicity α is determined, a new probability distribution for the opposite class is determined by determining $\tilde{P}(x_i|\overline{C})$ based on α (620). For example, the multiplicity a may be used to determine the new value for $N(x_i, C)$ and $\Sigma_j N(x_j, C)$ in equation (3) for class $\overline{C}$. Equation (3) can then be evaluated to determine $\tilde{P}(x_i|\overline{C})$.

The difference between the original probability distribution for the opposite class and the new probability distribution for the opposite class is then measured. For example, the Kullback-Leibler (KL) divergence between the original probability distribution for the opposite class and the new probability distribution for the opposite class may be calculated (630). The KL divergence may be calculated based on $\tilde{P}(x_i|\overline{C})$ and $P(x_i|\overline{C})$ as follows:

$$rdist(x) = KL(P(x \mid \overline{C}), \hat{P}(x \mid \overline{C})) = \sum_{x_i} P(x_i \mid \overline{C}) \log\left(\frac{P(x_i \mid \overline{C})}{\hat{P}(x_i \mid \overline{C})}\right) \quad (8)$$

The KL divergence value can be interpreted as the margin with which a particular decision is made, since it captures the amount of training required to achieve the opposite outcome.

The classification score is then modified based on the KL divergence (640). For example, a straightforward manner of modifying the score is to multiply the KL divergence by the classification score:

$$\hat{s}(x) = \text{score}(x) \cdot \text{rdist}(x) \quad (9)$$

In other implementations, a function of the KL divergence may be multiplied by the classification score. For example:

$$\hat{s}(x) = \text{score}(x) \cdot \exp(-\gamma \cdot \text{rdist}(x)) \quad (10)$$

where $\gamma$ is a tuning constant chosen by design. The constant $\gamma$ may be in the range of 0.001 to 50, for example.

As described briefly above, instead of using a default threshold $\theta$, the threshold $\theta$ can be adjusted before, during, or after classification to minimize or reduce misclassification costs. To that end, a set of e evaluation e-mails may be used. The evaluation e-mails are e-mails that have known classifications but were not used during training.

Figure 7:
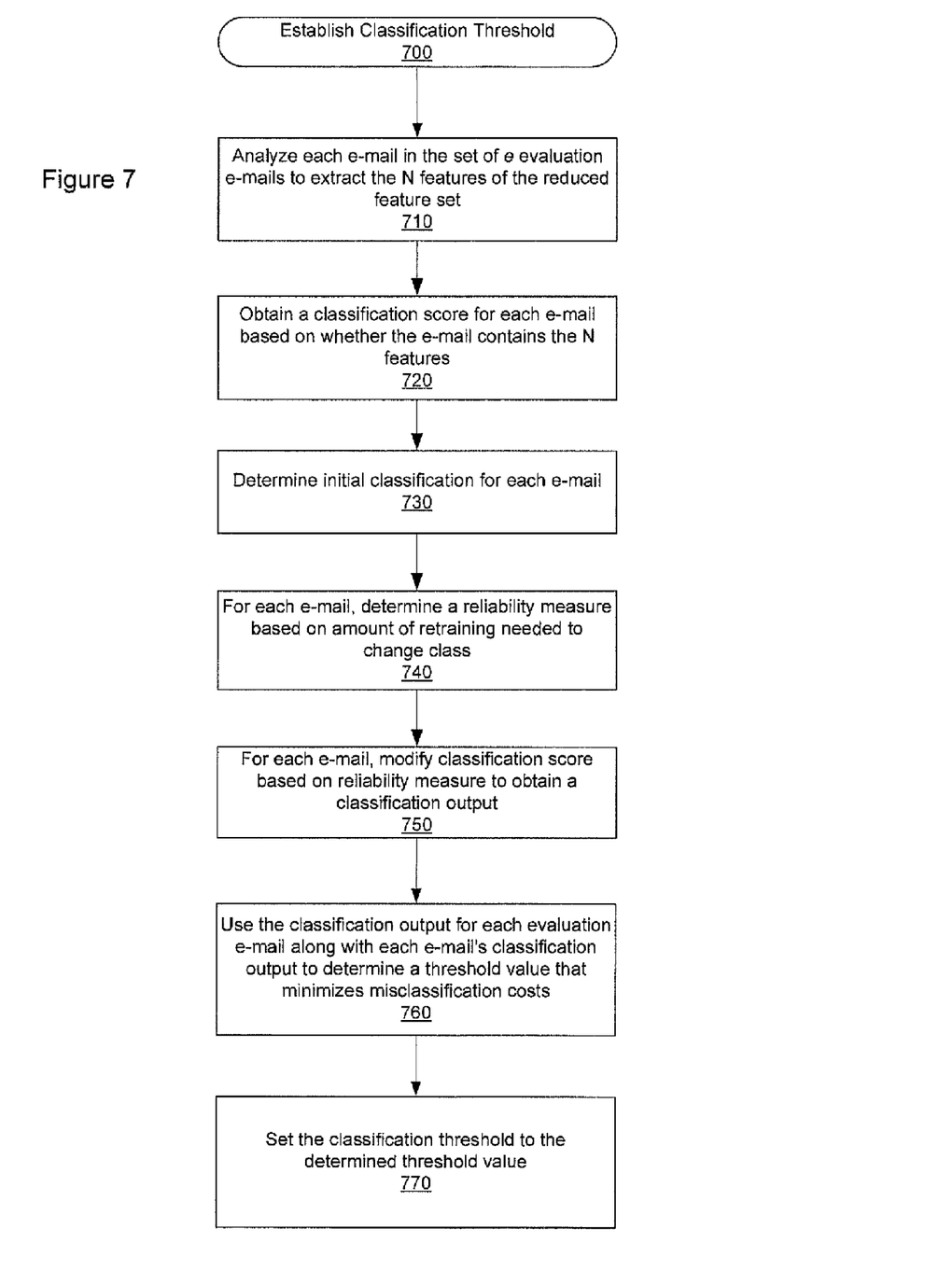
FIG. 7 is a flow chart illustrating an example of a process by which a classification threshold of the e-mail classifier of FIG. 3 may be adjusted.

Referring to FIG. 7, after training, to establish a classification threshold (700), these evaluation e-mails are input to e-mail classifier 232 and each e-mail in the evaluation set is analyzed to determine whether it contains the N features of the reduced feature set (710). This data is used to obtain a classification score for the e-mail (720) and an initial classification of the e-mail is determined based on the classification score (730). A reliability measure is then determined based on an amount of retraining needed to change the initial classification of the e-mail to the opposite class (740). The classification score is modified based on the reliability measure to obtain a classification output (750). Once the classification outputs are obtained, the classification outputs for the evaluation e-mails, along with their known classifications, are used to select a value for $\theta$ that minimizes the misclassification costs (760), and $\theta$ is then set to this value (770). To do so, a Receiver Operating Characteristic (ROC) curve may be constructed from the classification output and classifications, and an operating point on the ROC curve that minimizes misclassification costs may be chosen.

The misclassification costs ($L_u$) of a given classifier F with respect to a set of e-mails can be expressed in one exemplary representation as:

$$L_u = \pi \cdot \text{FP} + (1-\pi) \cdot \text{cost} \cdot \text{FN} \quad (11)$$

where the false-positive rate (FP) is:

$$FP = \frac{\sum_{x \in l_u} [F(x) = l]}{|s_u|} \quad (12)$$

and the false-negative rate (FN) is:

$$FN = \frac{\sum_{x \in s_u} [F(x) = s]}{l_u} \quad (13)$$

and where $\pi = s_u |E_u$, E is an evaluation set of e-mail, $E_u$ is the set of e-mails in set E, $s_u$ is the spam e-mail subset of $E_u$, and $l_u$ is the legitimate e-mail subset of $E_u$. [F(x)=s] is equal to one when the classifier returns spam as the class, zero otherwise. [F(x)=l] is equal to one when the classifier classifies an e-mail as legitimate, zero otherwise. The cost of misclassifying a spam e-mail as legitimate is assumed to be one, while cost represents the assigned cost of misclassifying legitimate e-mail as spam e-mail. The exact value of this parameter is chosen as a matter of design. For example, a value of 1000 may be chosen. As described further below, some implementations may use values of cost that depend on a legitimate e-mail's subcategory.

The relationship between FP and FN for a given classifier is known as the Receiver Operating Characteristic. Different choices of the classification threshold for a classifier result in different points along the classifier's ROC curve. Threshold selector 360 uses the classification outputs and known classifications to determine the threshold value that sets the operation of classifier 232 at a point on the classifier's ROC curve that minimizes $L_u$. For example, threshold selector 360 may evaluate $L_u$ for a number of different threshold values and choose the operation point that minimizes $L_u$.

While described as classifying e-mail as either spam or legitimate, e-mail classifier 232 may be designed to classify e-mail into more than just those two classes. For instance, e-mail classifier may be designed and trained to classify e-mail not only as legitimate, but to classify legitimate e-mail into one of different subcategories of legitimate e-mail. As an example, legitimate mail may have the following subcategories: personal, business related, e-commerce related, mailing list, and promotional. Personal e-mails are those that are exchanged between friends and family. Business related e-mails are generally those that are exchanged between coworkers or current and/or potential business partners. E-commerce related e-mails are those that are related to online purchases, such as registration, order, or shipment confirmations. Mailing list e-mails are those that relate to e-mail discussion groups to which users may subscribe. Promotional e-mails are the commercial e-mails that users have agreed to receive as part of some agreement, such as to view certain content on a web site.

To determine the class in the case of more than two classes, the problem may be split up into multiple two class problems. Each two class problem includes the target class, and the combination of the other, non-target classes. Each two class problem is then treated to according to the techniques described above to obtain a decision as to what class or classes the input item belongs two. If an input item is only allowed to belong to one class, then a decision rule may need to be formulated to make the class decision in the event that multiple classes are indicated by a comparison of the classification output to the decision threshold.

Furthermore, regardless of whether e-mail classifier 232 is specifically designed to classify legitimate e-mail into subcategories, classifier 232 may be designed to take into account the varying misclassification costs of misclassifying e-mail in a given subcategory of legitimate e-mail as spam. For instance, misclassifying a personal e-mail as spam typically is considered more costly than misclassifying a business related message as spam, But it may be considered more costly to misclassify a business related e-mail as spam than to misclassify a promotional e-mail as spam. These varying misclassification costs may be taken into account when setting the classification threshold.

For example, when setting the initial threshold, such varying costs can be taken into account by setting cost in equation (11) to:

$$\text{cost} = \sum_{cat} P(\text{cat} \mid l, x) C(s, \text{cat}) \quad (14)$$

where P(cat|l,x) is the probability that a particular legitimate e-mail x belongs to the subcategory cat (e.g., personal, business related, e-commerce related, mailing list, or promotional) and C(s,cat) is the cost of misclassifying a legitimate e-mail belonging to the subcategory cat as spam.

The following is an example list of subcategories cat and example costs C(s, cat) that may be used:

| Subcategory cat    | Misclassification Cost C(s, cat) |
|--------------------|----------------------------------|
| Personal           | 1000                             |
| Business Related   | 500                              |
| E-commerce related | 100                              |
| Mailing List Related | 50                             |
| Promotional        | 25                               |

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made.

For example, instead of using thresholds (whether set initially or during operation) that fully minimize the misclassification costs (i.e., reduce the misclassification cost to the minimized cost level), a threshold could instead be chosen that reduces the misclassification costs to a predetermined level above the minimized cost level. As another example, the foregoing description has described an e-mail classifier that labels mail for handling by a mail handler. However, in some implementations, it may not be necessary to label e-mail at all. For instance, the e-mail classifier may be designed to handle the e-mail appropriately based on the comparison of the classification output to the classification threshold. Alternatively, the e-mail may be marked with the classification output and the mail handler may handle the e-mail differently based on the particular value of the classification output. In other implementations, it may not be necessary to label all classes of e-mail. For example, the mail handler may be designed to only act on certain classes of e-mail and just deliver non-labeled e-mail. Thus, only e-mail in certain classes would need to be labeled.

Also, while a binary feature representation is described, other types of representations may be used. For example, a term frequency-inverse document frequency (tf-idf) representation or a term frequency (tf) representation may be used. Also, for non-text features, non-binary representations may additionally or alternatively be used. For example, if video or audio data is included, the features may include, respectively, color intensity or audio level. In this case, the color intensity or audio level features may be stored in a representation that indicates their levels, not just whether they exist (i.e., their analog values to may be stored and used).

Accordingly, implementations other than those specifically described are within the scope of the following claims.

What is claimed is:

1. A method for computing a classification threshold for a classifier, the method comprising:
    applying a classification model to a data item stored in a memory and having a known classification to produce a first classification score for the data item;
    determining a first classification of the data item based on the first classification score;
    determining an amount of retraining needed to change the first classification of the data item to a second, different classification;
    determining a reliability measure based on the amount of retraining needed to change the first classification of the data item to a second, different classification;
    modifying the first classification score based on the reliability measure to compute a second classification score;
    computing, using a processor, a threshold value that minimizes misclassification costs based, at least in part, on the second classification score and the known classification; and
    setting the classification threshold to the determined threshold value.

2. The method of claim 1 wherein determining an amount of retraining comprises determining a number of times that the data item needs to be added to training data items having the second classification to result in the classifier indicating that the data item has the second classification.

3. The method of claim 1 wherein determining an amount of retraining comprises determining an amount of change to the classification model to result in the classifier indicating that the data item has the second classification.

4. The method of claim 1, further comprising assigning different misclassification costs to different classifications.

5. The method of claim 4, wherein business-related or personal classifications have higher assigned misclassification costs than advertising or promotional classifications.

6. The method of claim 1 wherein the classification model is a Naïve Bayes based classification model.

7. The method of claim 1 wherein the data item comprises an e-mail.

8. A non-transitory computer-readable storage medium storing a program for determining a classification threshold for a classifier, the program comprising code for causing a processing device to perform the following operations:
    apply a classification model to a data item with a known classification to produce a first classification score for the data item;
    determine a first classification of the data item based on the first classification score;
    determine an amount of retraining needed to change the first classification of the data item to a second, different classification;
    determine a reliability measure based on the amount of retraining needed to change the first classification of the data item to a second, different classification;

modify the first classification score based on the reliability measure to compute a second classification score;

compute a threshold value that minimizes misclassification costs based, at least in part, on the second classification score and the known classification; and set the classification threshold to the determined threshold value.

9. The medium of claim 8 wherein determining an amount of retraining comprises determining a number of times that the data item needs to be added to training data items having the second classification to result in the classifier indicating that the data item has the second classification.

10. The medium of claim 8 wherein determining an amount of retraining comprises determining an amount of change to the classification model to result in the classifier indicating that the data item has the second classification.

11. The medium of claim 8, further comprising code for causing a processing device to assign different misclassification costs to different classifications.

12. The medium of claim 11, wherein business-related or personal classifications have higher assigned misclassification costs than advertising or promotional classifications.

13. The medium of claim 8 wherein the classification model is a Naïve Bayes based classification model.

14. The medium of claim 8 wherein the data item comprises an e-mail.

15. A method for computing a classification threshold for a classifier, the method comprising:

determining a first classification of a data item stored in a memory, wherein the first classification is based on a first classification score;

determining an amount of retraining needed to change the first classification of the data item to a second, different classification;

determining a reliability measure based on the amount of retraining needed to change the first classification of the data item to a second, different classification;

modifying the first classification score based on the reliability measure to compute a second classification score;

computing, using a processor, a threshold value that minimizes misclassification costs based, at least in part, on the second classification score and a known classification; and setting the classification threshold to the determined threshold value.

16. The method of claim 15 further comprising determining the amount of retraining by determining a number of times that the data item needs to be added to training data items having the second classification to result in the classifier indicating that the data item has the second classification.

17. The method of claim 15 further comprising determining the amount of retraining by determining an amount of change to a classification model to result in the classifier indicating that the data item has the second classification.

18. The method of claim 15, further comprising assigning different misclassification costs to different classifications.

19. The method of claim 18, wherein business-related or personal classifications have higher assigned misclassification costs than advertising or promotional classifications.

20. The method of claim 15 wherein the first classification score is computed according to a Naïve Bayes based classification model.

21. The method of claim 15 wherein the data item comprises an e-mail.

* * * * *